(12) United States Patent
Kihara et al.

(10) Patent No.: US 10,693,194 B2
(45) Date of Patent: Jun. 23, 2020

(54) NICKEL HYDROGEN SECONDARY BATTERY

(71) Applicant: FDK CORPORATION, Tokyo (JP)

(72) Inventors: Masaru Kihara, Tokyo (JP); Akira Saguchi, Tokyo (JP); Yusuke Shingai, Tokyo (JP); Jun Ishida, Tokyo (JP); Takuya Kai, Tokyo (JP)

(73) Assignee: FDK CORPORATION, Tokyo (JP)

( * ) Notice: Subject to any disclaimer, the term of this patent is extended or adjusted under 35 U.S.C. 154(b) by 247 days.

(21) Appl. No.: 15/317,106

(22) PCT Filed: Jun. 23, 2015

(86) PCT No.: PCT/JP2015/068038
§ 371 (c)(1),
(2) Date: Dec. 7, 2016

(87) PCT Pub. No.: WO2015/199072
PCT Pub. Date: Dec. 30, 2015

(65) Prior Publication Data
US 2017/0110764 A1      Apr. 20, 2017

(30) Foreign Application Priority Data

Jun. 27, 2014   (JP) .................................. 2014-132777

(51) Int. Cl.
*H01M 4/24* (2006.01)
*H01M 4/38* (2006.01)
(Continued)

(52) U.S. Cl.
CPC ........... *H01M 10/30* (2013.01); *H01M 4/242* (2013.01); *H01M 4/38* (2013.01); *H01M 4/383* (2013.01);
(Continued)

(58) Field of Classification Search
CPC ........ H01M 4/242; H01M 4/38; H01M 4/383; H01M 4/385; H01M 4/46; H01M 4/52;
(Continued)

(56) References Cited

U.S. PATENT DOCUMENTS 8,377,555 B2 * 2/2013 Mohtadi .................. B01J 20/04
428/404
2007/0269717 A1   11/2007 Bandou et al.
(Continued)

FOREIGN PATENT DOCUMENTS

CN      103259003 A      8/2013
CN      103700895 A      4/2014
(Continued)

OTHER PUBLICATIONS

Extended European Search Report, for European Patent Application No. 15812439.6, dated Oct. 19, 2017, 8 pages.
(Continued)

*Primary Examiner* — Brittany L Raymond
(74) *Attorney, Agent, or Firm* — Kinney & Lange, P.A.

(57) ABSTRACT

A nickel hydrogen secondary battery accommodates an electrode group including a positive electrode and a negative electrode which are stacked one on top of another through a separator, together with an alkaline electrolyte. The battery contains Li, with a total amount of Li in the battery 2 of 15 to 50 mg/Ah, as determined as the mass in terms of LiOH per Ah of the positive electrode capacity. The negative electrode includes particles of rare earth-Mg—Ni-based hydrogen storage alloy which contains a rare earth element, Mg and Ni. The hydrogen storage alloy particles 44 includes, on the surface thereof, a rare earth hydroxide which is the hydroxide of a rare earth element and has a specific surface area of 0.1 to 0.5 $m^2/g$.

9 Claims, 1 Drawing Sheet

(51) Int. Cl.
  *H01M 4/46* (2006.01)
  *H01M 4/52* (2010.01)
  *H01M 10/26* (2006.01)
  *H01M 10/30* (2006.01)
  *H01M 4/62* (2006.01)
  *H01M 10/34* (2006.01)
(52) U.S. Cl.
  CPC ............. *H01M 4/385* (2013.01); *H01M 4/46* (2013.01); *H01M 4/52* (2013.01); *H01M 4/62* (2013.01); *H01M 10/26* (2013.01); *H01M 10/347* (2013.01)
(58) Field of Classification Search
  CPC ........ H01M 4/62; H01M 10/26; H01M 10/30; H01M 10/347
  See application file for complete search history.

(56) References Cited

U.S. PATENT DOCUMENTS

| | | | | |
|---|---|---|---|---|
| 2013/0213532 A1* | 8/2013 | Kanemoto | ............ | H01M 4/242 148/555 |
| 2013/0260216 A1* | 10/2013 | Takei | .................... | H01M 4/466 429/163 |
| 2014/0087253 A1* | 3/2014 | Okuda | .................. | H01M 4/383 429/218.2 |

FOREIGN PATENT DOCUMENTS

| | | | |
|---|---|---|---|
| EP | 2713426 | A1 | 4/2014 |
| JP | 04-137361 | A | 5/1992 |
| JP | H09-063581 | | 3/1997 |
| JP | 2953463 | B | 7/1999 |
| JP | 2000-021398 | A | 1/2000 |
| JP | 2003-217590 | A | 7/2003 |
| JP | 2005093289 | | 4/2005 |
| JP | 2013206866 | | 10/2013 |
| JP | 2013251061 | A | 12/2013 |
| JP | 2014089879 | A | 5/2014 |

OTHER PUBLICATIONS

English translation of the International Search Report dated Sep. 8, 2015, for corresponding PCT Application No. PCT/JP2015/068038.

* cited by examiner

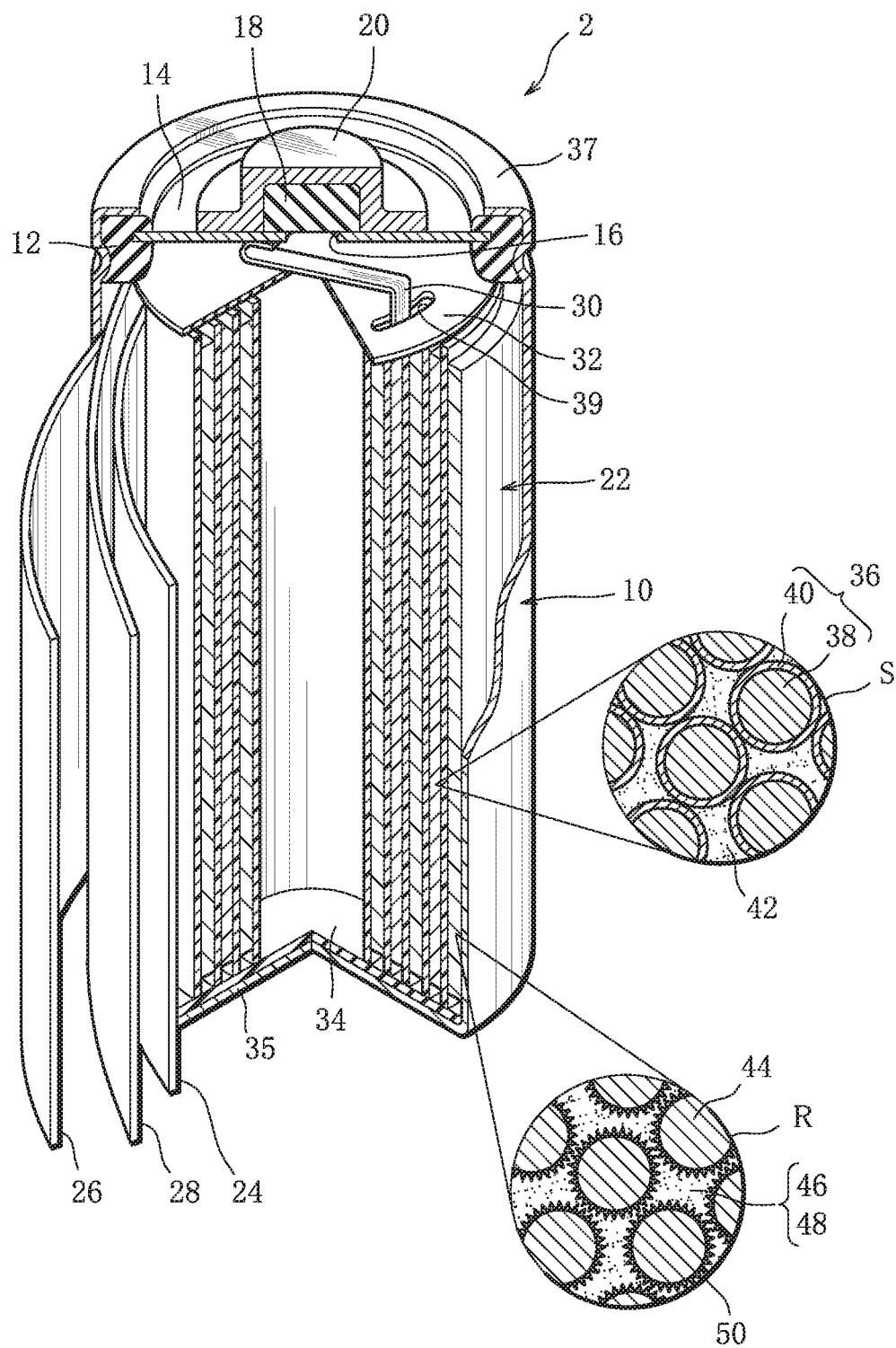

NICKEL HYDROGEN SECONDARY BATTERY

TECHNICAL FIELD

The present invention relates to a nickel hydrogen secondary battery.

BACKGROUND ART

It is known that a nickel hydrogen secondary battery with a negative electrode containing a hydrogen storage alloy has a higher capacity and higher environmental safety than a nickel cadmium secondary battery, and has been therefore used for more and more applications including use in various apparatuses such as mobile electronic devices, electric power tools, and hybrid electric vehicles.

Due to the expanding applications, further increase in the capacity of a nickel hydrogen secondary battery is desired. One step for further increasing the capacity of a nickel hydrogen secondary battery is to improve the utilization factor of a positive electrode active material. More specifically, a conductive network of a cobalt compound with high conductivity is formed on the surface of nickel hydroxide particles as positive electrode active material. The formation of the conductive network improves the conductivity of the positive electrode active material, so that the utilization factor of the active material improves. Consequently, further increase in the capacity of a nickel hydrogen secondary battery can be achieved.

For use of a nickel hydrogen secondary battery, charging and discharging are repeated. The charge-discharge reaction associated with charging and discharging slightly reduces the valence of the cobalt compound forming the conductive network in the internal part of a nickel hydrogen secondary battery. As the number of repeating of the charge-discharge increases, the accumulated reduction in the valence of the cobalt compound results in gradual reduction in the conductivity. Consequently, the sufficient function of the conductive network cannot be achieved, so that the capacity of the battery gradually decreases. In addition, the cobalt compound forming the conductive network is partially reduced in the last stage of discharging, so that the elution phenomenon of the compound occurs. The reduction and elution of the cobalt compound causes the partial destruction of the conductive network, resulting in reduction in the conductivity of the positive electrode. Consequently, the charging acceptability is impaired and the capacity decreases due to the reduction in the utilization factor of the positive electrode active material.

As described above, a nickel hydrogen secondary battery having an increased capacity causes a problem of deterioration in cycle life properties due to reduction in the capacity associated with the increase in the number of the charge-discharge cycles. Accordingly, various trials have been made to improve the cycle life properties of a nickel hydrogen secondary battery (e.g. Patent Literature 1).

The nickel hydrogen secondary battery typically described in Patent Literature 1 has a positive electrode to which lithium hydroxide or lithium is added. The lithium hydroxide or lithium stabilizes the cobalt compound forming a conductive network and suppresses the reduction in the valence of the cobalt compound and the reduction/elution reaction associated with the charge-discharge cycle, so that the cycle life properties of the nickel hydrogen secondary battery can be improved.

CITATION LIST

Patent Literature

Patent Literature 1: Japanese Patent No. 2953463

SUMMARY OF INVENTION

Technical Problem

Due to the recent increase in the power consumption of the apparatuses described above, the nickel hydrogen secondary battery for use in the apparatuses is required to discharge at a higher rate.

The nickel hydrogen secondary battery in Patent Literature 1 includes lithium added in order to improve the cycle life properties as described above. The presence of lithium in a positive electrode, however, allows an alkaline electrolyte to be incorporated into a layer between crystals of nickel hydroxide, with reduction in the amount of the alkaline electrolyte contained in a separator. When the alkaline electrolyte is gathered into the positive electrode, the alkaline electrolyte in the separator runs out. Consequently, the internal resistance of the battery increases to impede the discharge properties, resulting in reduction in the high-rate dischargeability. Namely, the high-rate dischargeability of the nickel hydrogen secondary battery typically described in Patent Literature 1 is not very high. In addition, the amount of heat generated by a battery associated with charge-discharge increases with the rise of the internal resistance, and the heat allows the corrosion reaction of the hydrogen storage alloy of the negative electrode caused by the alkaline electrolyte to further proceed. When the corrosion reaction proceeds, the alkaline electrolyte is consumed, so that the amount of the alkaline electrolyte further decreases. Consequently, the internal resistance of the battery further increases, resulting in reduction in the high-rate dischargeability of the battery. In addition, as the corrosion reaction as described above proceeds, the ability of the hydrogen storage alloy to absorb and release hydrogen decreases, which also impedes the cycle life properties of the battery.

It is a common practice to use a battery pack consisting of a bundle of a plurality of batteries for an apparatus with large power consumption. In the case of the battery pack, the respective amounts of heat generated from the batteries are added up, so that each of the batteries is exposed to higher temperature. Consequently the corrosion reaction described above further proceeds, so that decline in the cycle life properties due to deterioration of the hydrogen storage alloy and the reduction in the high-rate dischargeability due to the reduced amount of the alkaline electrolyte become more distinguished.

Under the circumstances, the conventional nickel hydrogen secondary battery typically described in Patent Literature 1 cannot sufficiently respond to the recent severe use conditions. In other words, the high-rate dischargeability and the life properties of a nickel hydrogen secondary battery have not been made compatible, yet.

The present invention has been made under these circumstances, and an object thereof is to provide a nickel hydrogen secondary battery having high-rate dischargeability compatible with life properties.

Solution to Problem

In order to achieve the above object, an aspect of the present invention is directed to a nickel hydrogen secondary battery comprising an electrode group hermetically enclosed in a container together with an alkaline electrolyte, the electrode group including a positive electrode and a negative electrode which are stacked one on top of another through a separator, wherein the nickel hydrogen secondary battery contains Li, with a total amount of Li in the nickel hydrogen secondary battery of 15 to 50 mg/Ah, as determined as the mass in terms of LiOH per Ah of the positive electrode capacity; the negative electrode includes particles of rare earth-Mg—Ni-based hydrogen storage alloy which contains a rare earth element, Mg and Ni; and the hydrogen storage alloy particles include, on the surface thereof, a rare earth hydroxide which is the hydroxide of the rare earth element, and have a specific surface area of 0.1 to 0.5 m$^2$/g.

Preferably the hydrogen storage alloy is configured to have a composition represented by a general formula: $Ln_{1-x}Mg_x(Ni_{1-y}T_y)_z$, wherein Ln represents at least one element selected from La, Ce, Pr, Nd, Pm, Sm, Eu, Gd, Tb, Dy, Ho, Er, Tm, Yb, Lu, Ca, Sr, Sc, Y, Ti, Zr and Hf; T represents at least one element selected from Mn, Co, V, Nb, Ta, Cr, Mo, Fe, Al, Ga, Zn, Sn, In, Cu, Si, P and B; and the subscripts x, y and z satisfy relations $0<x\leq1$, $0\leq y\leq0.5$, and $2.5\leq z\leq4.5$, respectively.

More preferably the hydrogen storage alloy is configured to have a composition configured to exclude Mn and Co.

Preferably the La content ratio of the rare earth element components of the hydrogen storage alloy is configured to 20 mass % or more.

Preferably the Sm content ratio of the rare earth element components of the hydrogen storage alloy is 20 mass % or more.

Preferably the positive electrode is configured to comprise positive electrode active material particles, wherein the positive electrode active material particles comprise base particles composed mainly of nickel hydroxide and a conductive layer comprising a Li-containing Co compound and covering the surface of the base particles.

Preferably the positive electrode is configured to comprise at least one additive selected from the group consisting of a Y compound, a Nb compound, an Yb compound, and a W compound.

Preferably the alkaline electrolyte is configured to comprise LiOH.

Preferably the rare earth hydroxide is configured to be needle crystals deposited on the surface of the hydrogen storage alloy particles.

Advantageous Effects of Invention

The nickel hydrogen secondary battery of the present invention comprises a configuration in which the total amount of Li contained in the battery is 15 to 50 mg/Ah in terms of LiOH per Ah of the positive electrode capacity, and a configuration in which hydrogen storage alloy particles contained in the negative electrode have, on the surface thereof, a rare earth hydroxide which is the hydroxide of a rare earth element, and has a specific surface area of 0.1 to 0.5 m$^2$/g. The Li described above prevents destruction of the conductive network, so that the cycle life of the battery can be improved. On the other hand, the rare earth hydroxide has corrosion resistance against the alkaline electrolyte. Since the hydrogen storage alloy particles have a specific surface area of 0.1 to 0.5 m$^2$/g, the amount of the rare earth hydroxide existing in the surface of the hydrogen storage alloy particles is controlled within a proper range. The corrosion reaction of the hydrogen storage alloy is therefore suppressed and the amount of the alkaline electrolyte consumed by the corrosion reaction is reduced, so that a sufficient amount of the alkaline electrolyte remains in the battery. Consequently, even when the alkaline electrolyte is incorporated into the positive electrode due to the presence of Li, a sufficient amount of the alkaline electrolyte is held in a separator, so that the internal resistance of the battery can be maintained low to improve the high-rate dischargeability. As a result, the nickel hydrogen secondary battery of the present invention can achieve the high-rate dischargeability compatible with the life properties.

BRIEF DESCRIPTION OF DRAWING

FIG. 1 is a partially cutout perspective view of the nickel hydrogen secondary battery in an embodiment of the present invention.

DESCRIPTION OF EMBODIMENTS

The nickel hydrogen secondary battery 2 of the present invention (hereinafter simply referred to as battery) is described with reference to the drawing as follows.

Although the present invention is applicable to any battery 2, for example, a cylindrical battery 2 with an AA size shown in FIG. 1 to which the present invention is applied is described.

As shown in FIG. 1, the battery 2 is equipped with a bottomed cylindrical external can 10 with an open top. The external can 10 has conductivity and the bottom wall 35 thereof functions as negative electrode terminal. In the opening of the external can 10, a disc-shaped conductive lid plate 14 and a ring-shaped insulating packing 12 to surround the lid plate 14 are disposed. The insulating packing 12 is fixed to the opening edge 37 of the external can 10 by caulking of the opening edge 37 of the external can 10. Namely, the lid plate 14 and the insulating packing 12 hermetically enclose the opening of the external can 10 in conjunction with each other.

The lid plate 14 has a central through hole 16 at the center and a rubber valve 18 to block the central through hole 16 is disposed on the external surface of the lid plate 14. Further, a cylindrical positive electrode terminal 20 with a flange is fixed to the external surface of the lid plate 14 so as to cover the valve 18. The positive electrode terminal 20 applies pressure to the valve 18 toward the lid plate 14. The positive electrode terminal 20 has an open hole for degassing, which is not shown in the drawing.

Under normal conditions, the central through hole 16 is hermetically closed with the valve 18. On the other hand, when the internal pressure of the external can 10 increases due to generation of gas in the external can 10, the valve 18 is compressed by the internal pressure so as to open the central through hole 16. Consequently the gas is discharged to the outside from the inside of the external can 10 through the central through hole 16 and the degassing hole of the positive electrode terminal 20. Namely, the central through hole 16, the valve 18 and the positive electrode terminal 20 constitute a safety valve for the battery.

An electrode group 22 is accommodated in the external can 10. The electrode group 22 includes a positive electrode 24, a negative electrode 26, and a separator 28 each having a belt shape, which are wound in a spiral form, with the separator 28 being inserted between the positive electrode 24 and the negative electrode 26. Namely, the positive electrode 24 and the negative electrode 26 are stacked one on top of another through the separator 28. The outermost periphery of the electrode group 22 is formed of a part of the negative electrode 26 (outermost peripheral part) and is in contact with the inner peripheral wall of the external can 10. Namely the negative electrode 26 and the external can 10 are electrically connected to each other.

A positive electrode lead 30 is disposed between the one end of the electrode group 22 and a lid plate 14 in the external can 10. To be specific, one end of the positive electrode lead 30 is connected to the positive electrode 24, and another end is connected to the lid plate 14. The positive electrode terminal 20 and the positive electrode 24 are therefore electrically connected to each other through the positive electrode lead 30 and the lid plate 14. A circular insulating member 32 is disposed between the lid plate 14 and the electrode group 22, and the positive electrode lead 30 extends through a slit 39 provided in the insulating member 32. A circular insulating member 34 is also disposed between the electrode group 22 and the bottom of the external can 10.

Besides, a predetermined amount of alkaline electrolyte (not shown in the drawing) is contained in the external can 10. The electrode group 22 is impregnated with the alkaline electrolyte so that the charge-discharge reaction proceeds between the positive electrode 24 and the negative electrode 26. Examples of the alkaline electrolyte include a sodium hydroxide aqueous solution, a lithium hydroxide aqueous solution, a potassium hydroxide aqueous solution, and an aqueous solution of the mixture of two or more thereof. In a preferred aspect, the alkaline electrolyte contains LiOH, because the cycle life properties can be improved by the LiOH contained therein.

The separator 28 prevents the positive electrode 24 and the negative electrode 26 from being short-circuited and retains the alkaline electrolyte. As the material for the separator 28, for example, a non-woven fabric of polyamide fiber and a non-woven fabric of polyolefin fiber such as polyethylene or polypropylene fiber to which a hydrophilic functional group is added can be used. More specifically, a non-woven fabric composed mainly of polyolefin fiber sulfonated for addition of a sulfone group is preferred. The sulfone group is added by treating the non-woven fabric with an acid containing a sulfuric group, such as sulfuric acid or oleum. A battery with use of the separator which contains such fiber having a sulfone group is excellent in self discharge properties.

The positive electrode 24 comprises a conductive positive electrode base material having a porous structure and a positive electrode mixture retained in the pores of the positive electrode base material.

Examples of the positive electrode base material for use include a nickel-plated metal body in a mesh form, sponge form, or fibrous form, or a foamed nickel (nickel foam).

The positive electrode mixture comprises positive electrode active material particles 36 and a binding material 42 as schematically shown in the circle S in FIG. 1. The binding material 42 binds the positive electrode active material particles 36 to each other and binds the positive electrode mixture to the positive electrode base material at the same time. Examples of the binding material 42 for use include carboxymethyl cellulose, methyl cellulose, PTFE (polytetrafluoroethylene) dispersion, and HPC (hydroxypropyl cellulose) dispersion.

The positive electrode active material particles 36 comprises base particles 38 and a conductive layer 40 covering the surface of the base particles 38.

The base particles 38 are nickel hydroxide particles or high-order nickel hydroxide particles. The average particle diameter of the base particles 38 is preferably set within a range of 8 μm to 20 μm. Since a non-sintered positive electrode can increase the electrode reaction area of the positive electrode by increasing the surface area of the positive electrode active material so as to achieve the high output of a battery, the base particles 38 to make the base of the positive electrode active material preferably have a small average particle diameter of 20 μm or less. In the case of the conductive layer 40 having a consistent thickness to be deposited on the surface of the base particles, however, the proportion of the conductive layer 40 part increases as the diameter of the base particles 38 decreases, resulting in harmful reduction in the unit capacity. Considering the manufacturing yield rate of the base particles 38, the particle diameter is preferably 8 μm or more. The more preferred range is 10 μm to 16 μm.

Preferably the nickel hydroxide described above solid-dissolves at least one of cobalt and zinc. The cobalt enhances the conductivity of the internal part of the positive electrode active material particles and contributes to improvement in the high-rate dischargeability of the battery. The zinc suppresses the swelling of the positive electrode associated with the progress of charge-discharge cycle and contributes to improvement in the cycle life properties of the battery.

The content of the above-described elements solid-dissolved in the nickel hydroxide particles is preferably 0.5 to 6.0 mass % for cobalt and 1.0 to 7.0 mass % for zinc, relative to nickel hydroxide. More preferably the cobalt content is 0.7 to 2.0 mass % and the zinc content is 2.0 to 5.0 mass %.

The base particles 38 may be manufactured, for example, by the following method.

First, a nickel sulfate aqueous solution is prepared. A sodium hydroxide aqueous solution is gradually added to and reacted with the nickel sulfate aqueous solution, so that the base particles 38 of nickel hydroxide are deposited. In the case of the nickel hydroxide particles with zinc and cobalt solid-dissolved therein, nickel sulfate, zinc sulfate, and cobalt sulfate are weighed for a predetermined composition, and an aqueous solution of the mixture thereof is prepared. While the aqueous solution of the mixture obtained is agitated, sodium hydroxide aqueous solution is gradually added to and reacted with the aqueous solution of the mixture, so that the base particles 38 composed mainly of nickel hydroxide with zinc and cobalt solid-dissolved can be deposited.

The conductive layer 40 comprises a cobalt compound which contains lithium (hereinafter referred to as lithium-containing cobalt compound). More specifically, the lithium-containing cobalt compound includes a crystal of a cobalt compound such as cobalt oxyhydroxide (CoOOH) and cobalt hydroxide ($Co(OH)_2$) in which lithium is incorporated. Since the lithium-containing cobalt compound has extremely high conductivity, a favorable conductive network capable of enhancing the utilization factor of the active material in the positive electrode is formed.

The conductive layer 40 is formed according to the following procedure.

First, the base particles 38 are fed into an ammonia aqueous solution, and a cobalt sulfate aqueous solution is added to the aqueous solution. As a result, cobalt hydroxide is deposited on the surface of the base particles 38 as nuclei, so that intermediate particles having a layer of cobalt hydroxide is formed. The intermediate particles obtained are circulated in the oxygen-containing air under high-temperature environment, and subjected to a heating treatment at a predetermined heating temperature and for a predetermined heating time, while being sprayed with a lithium hydroxide aqueous solution. In the preferred heating treatment, the temperature is held at 80° C. to 100° C. for 30 minutes to 2 hours. The treatment allows the cobalt hydroxide on the surface of the intermediate particles to form into a cobalt compound having high conductivity (e.g. cobalt oxyhydroxide) and to incorporate lithium in parallel. As a result, positive electrode active material particles 36 covered with the conductive layer 40 of a lithium-containing cobalt compound are obtained.

Preferably the cobalt compound as conductive layer 40 further contains sodium so as to increase the stability of the conductive layer. The cobalt compound which further contains sodium is made by spraying a lithium hydroxide aqueous solution together with a sodium hydroxide aqueous solution to the intermediate particles circulated in the air under high-temperature environment, and then subjecting the resulting intermediate particles to a heating treatment. As a result, positive electrode active material particles 36 covered with the conductive layer 40 comprising a cobalt compound which contains lithium and sodium.

The positive electrode 24 can be manufactured, for example, by the following method.

First, a positive electrode mixture paste which contains the positive electrode active material particles 36 obtained as described above, water and the binding material 42 is prepared. For example, a nickel metal in a sponge form (nickel foam) is filled with the positive electrode mixture paste to be dried. After drying the nickel foam filled with the nickel hydroxide particles and the like is rolled and then cut into the positive electrode 24.

In the positive electrode 24 thus obtained, the positive electrode active material particles 36 composed of the base particles 38 of which the surface is covered with the conductive layer 40 are in contact with each other as shown in the circle S in FIG. 1, so that a conductive network is formed from the conductive layer 40.

To the positive electrode 24, preferably at least one additive selected from the group consisting of a Y compound, a Nb compound, an Yb compound, and a W compound is added. The additive suppresses the elution of cobalt from the conductive layer and prevents the destruction of the conductive network. As the Y compound, for example, yttrium oxide is preferably used. As the Nb compound, for example, niobium oxide is preferably used. As the Yb compound, for example, ytterbium oxide is preferably used. As the W compound, for example, tungsten oxide is preferably used.

The additive is added to the positive electrode mixture, and the additive content is preferably set in a range of 0.2 to 2 parts by mass relative to 100 parts by mass of the positive electrode active material particles. The reason is that with an additive content of less than 0.2 parts by mass, the effect on preventing the elution of cobalt from the conductive layer is small, and with an additive content of more than 2 parts by mass, the effect is saturated and the capacity decreases due to the relative reduction in the amount of the positive electrode active material.

The battery 2 of the present invention contains a specified total amount of Li in the battery. The present inventor found that the presence of Li not only in the conductive layer of the positive electrode active material particles, but also in other places in the nickel hydrogen secondary battery such as the positive electrode mixture, the negative electrode mixture, the separator, and the alkaline electrolyte allows the Li to reach the conductive layer of the positive electrode active material particles through the alkaline electrolyte, and prevents destruction of the conductive network caused by the elution of cobalt from the conductive layer of the positive electrode active material particles. The proper amount of Li in the battery was therefore specified. The Li is described in detail as follows.

The total amount W of Li contained in the battery of the present invention is specified to be 15 to 50 mg/Ah, as determined as the mass in terms of LiOH per Ah of the positive electrode capacity.

With a total amount W of Li of less than 15 mg/Ah, the effect on preventing destruction of the conductive network is small. On the other hand, the effect on preventing destruction of the conductive network increases as the total amount W of Li increases. With a total amount W of Li of more than 50 mg/Ah, however, a harmful decline in the low-temperature discharge properties of the battery occurs, so that the upper limit is set to 50 mg/Ah. Preferably the range of the total amount W of Li is set to 40 mg/Ah≤W≤50 mg/Ah.

Examples of the method for making Li present in the form of LiOH in a battery include spraying a LiOH aqueous solution to the positive electrode active material particles, adding LiOH to the alkaline electrolyte, mixing LiOH into the positive electrode mixture paste, supporting LiOH on the separator, and treating the negative electrode hydrogen storage alloy with LiOH. Preferably these methods may be employed singly or in combination. Among them, the method for spraying a LiOH aqueous solution to the positive electrode active material particles in the embodiment described above is preferred due to easiness in the treatment for densely distributing Li in the positive electrode. In the case of using a lithium hydroxide aqueous solution as the alkaline electrolyte, preferably LiOH is nearly saturated in the composition of the alkaline electrolyte.

Subsequently the negative electrode 26 is described as follows.

The negative electrode comprises a belt-like conductive negative electrode substrate (core) and a negative electrode mixture retained on the negative electrode substrate.

The negative electrode substrate comprises a sheet-like metal member with through holes distributed, which may be made of, for example, a sheet of punched metal and a sintered substrate formed from metal powder in a mold. Not only the through holes of the negative electrode substrate are filled with the negative electrode mixture, but also both surfaces of the negative electrode substrate retain the negative electrode mixture in a layered state.

As schematically shown in the circle R in FIG. 1, the negative electrode mixture comprises hydrogen storage alloy particles 44, a conduction aid 46, and a binding material 48. The binding material 48 acts to bind the hydrogen storage alloy particles 44 and the conduction aid 46 to each other and bind the negative electrode mixture to the negative electrode substrate at the same time. The hydrogen storage alloy is an alloy capable of absorbing and releasing hydrogen as the negative electrode active material. As the binding material 48 described above, a hydrophilic or hydrophobic polymer and the like may be used, and as the conduction aid 46, carbon black or graphite may be used.

As the hydrogen storage alloy of the hydrogen storage alloy particles 44, a rare earth-Mg—Ni-based hydrogen storage alloy which contains a rare earth element, Mg and Ni is used. The preferred aspect of the rare earth-Mg—Ni-based hydrogen storage alloy has a composition represented by the following general formula (I).

$$Ln_{1-x}Mg_x(Ni_{1-y}T_y)_z \hspace{2cm} (I)$$

In the general formula (I), Ln represents at least one element selected from La, Ce, Pr, Nd, Pm, Sm, Eu, Gd, Tb, Dy, Ho, Er, Tm, Yb, Lu, Ca Sr, Sc, Y, Ti, Zr and Hf; T represents at least one element selected from Mn, Co, V, Nb, Ta, Cr, Mo, Fe, Al, Ga, Zn, Sn, In, Cu, Si, P and B; and the subscripts x, y and z satisfy relations $0<x\leq1$, $0\leq y\leq0.5$, and $2.5\leq z\leq4.5$, respectively.

When a component A represents Ln and Mg in the general formula (I) and a component B represents Ni and T, the hydrogen storage alloy of the present invention has a so-called superlattice structure, i.e. an $A_2B_7$ structure or an $A_5B_{19}$ structure composed of $AB_2$ subunits and $AB_5$ subunits which are layered one on top of another. The rare earth-Mg—Ni-based hydrogen storage alloy having such a superlattice structure has both of the advantage of stable absorbing and releasing of hydrogen as a feature of an $AB_5$ alloy and the advantage of a large amount of hydrogen stored as a feature of an $AB_2$ alloy. The hydrogen storage alloy of the present invention, therefore, has excellent hydrogen storage performance, contributing to the increase in the capacity of the battery 2 to be obtained.

In the investigation to improve the durability of a cobalt compound such as cobalt oxyhydroxide in the positive electrode, the present inventor found that in the case of using a hydrogen storage alloy which contains Mn and Co as the hydrogen storage alloy of the negative electrode, the components such as Mn and Co elute into the alkaline electrolyte and reach the surface of the positive electrode active material so as to reduce and elute cobalt oxyhydroxide and the like of the conductive network. In order to avoid impeding the conductivity in the battery, use of a rare earth-Mg—Ni-based hydrogen storage alloy having a composition excluding Mn and Co as the hydrogen storage alloy of the present invention is more preferred.

The hydrogen storage alloy particles 44 for use in the present invention has a rare earth hydroxide 50 as the hydroxide of a rare earth element on the surface. The rare earth hydroxide 50 is formed by the alkaline treatment to immerse the hydrogen storage alloy particles 44 in an alkaline solution. Due to the alkaline treatment of the hydrogen storage alloy particles 44, the rare earth hydroxide 50 is deposited as needle crystals to form irregularities on the surface of the hydrogen storage alloy particles 44.

The rare earth hydroxide 50 prevents the corrosion of the hydrogen storage alloy by the alkaline electrolyte. Namely, the presence of the rare earth hydroxide 50 on the surface of the hydrogen storage alloy can reduce the amount of the alkaline electrolyte to be consumed in the corrosion reaction of the hydrogen storage alloy. With less reduction in the amount of alkaline electrolyte in the battery, the alkaline electrolyte is sufficiently retained in the separator even when the alkaline electrolyte is incorporated in the positive electrode, so that the rise of the internal resistance of the battery can be prevented. As a result, this contributes to improvement in the high-rate dischargeability of the battery. In addition, due to the reduction in the internal resistance in the battery, the heat generation in the battery is suppressed, so that the progress of the corrosion reaction of the hydrogen storage alloy slows down and the consumption of the alkaline electrolyte associated with the corrosion reaction decreases.

The rare earth hydroxide 50 is non-conductive, so that an excessively large amount of the rare earth hydroxide 50 on the surface of the hydrogen storage alloy particles 44 interferes with the charge-discharge reaction. On the other hand, an excessively small amount of the rare earth hydroxide 50 reduces the effect described above. Preferably the amount of the rare earth hydroxide 50 is, therefore, controlled to be in a proper range.

The amount of the rare earth hydroxide 50 is proportional to the degree of the irregularities on the surface of the hydrogen storage alloy particles 44. Accordingly, the degree of irregularities is obtained as the specific surface area of the hydrogen storage alloy particles 44, and the amount of the rare earth hydroxide 50 on the surface of the hydrogen storage alloy particles 44 is seized from the specific surface area, so that the proper amount of the rare earth hydroxide 50 can be controlled.

In the present invention, with a specific surface area of the hydrogen storage alloy particles 44 of less than 0.1 $m^2/g$, the amount of the rare earth hydroxide 50 on the surface of the hydrogen storage alloy particles 44 is small, so that the sufficient effect described above cannot be obtained. On the other hand, with a specific surface area of the hydrogen storage alloy particles 44 of more than 0.5 $m^2/g$, the amount of the rare earth hydroxide 50 on the surface of the hydrogen storage alloy particles 44 increases, so that the conductivity of the hydrogen storage alloy-containing negative electrode decreases to block the charge-discharge reaction of the battery. Accordingly, the specific surface area of the hydrogen storage alloy particles 44 is preferably controlled in a range of 0.1 to 0.5 $m^2/g$.

The hydrogen storage alloy particles 44 can be obtained, for example, by the following method.

First, raw material metals are weighed to prepare a predetermined composition and mixed. The mixture is melted, for example, in an induction melting furnace to make an ingot. The ingot obtained is heated for 5 to 24 hours under an inert gas atmosphere at 900 to 1200° C. for heat treatment. The ingot is then crushed and sieved to obtain an intermediate product of hydrogen storage alloy particles with a desired particle diameter. Subsequently the intermediate product obtained is immersed in an alkaline aqueous solution at a predetermined temperature for a predetermined time for alkaline treatment. In the alkaline treatment, the type and normality of the alkaline aqueous solution for use is not particularly limited, and, for example, 5 to 9 N potassium hydroxide aqueous solution is preferably used. In the alkaline treatment, the temperature of the alkaline aqueous solution is preferably set to 60 to 100° C., and the treatment time is preferably set to 0.5 to 2.0 hours. The measured specific surface area of the alkaline-treated hydrogen storage alloy particles is in a range of 0.1 to 0.5 $m^2/g$.

Through the alkaline treatment described above, the hydrogen storage alloy particles 44 having a surface on which a proper amount of needle crystals of the rare earth hydroxide 50 are deposited can be obtained.

The negative electrode 26 is manufactured, for example, by the following method.

Hydrogen storage alloy powder made of hydrogen storage alloy particles 44 having the rare earth hydroxide 50 on the surface through the alkaline treatment described above, a conduction aid 46, a binding material 48 and water are kneaded to prepare a negative electrode mixture paste. The negative electrode mixture paste obtained is applied to a negative electrode substrate and dried. After drying, the negative electrode substrate bonded to the hydrogen storage alloy particles 44 and the like is subjected to rolling and cutting, so that the negative electrode 26 is manufactured.

The positive electrode 24 and the negative electrode 26 thus manufactured are wound in a spiral form, with a separator 28 being inserted between them. An electrode group 22 is thus formed.

The electrode group 22 thus obtained is accommodated in an external can 10. Subsequently a predetermined amount of alkaline electrolyte is injected into the external can 10. The external can 10 accommodating the electrode group 22 and the alkaline electrolyte is then sealed with a lid plate 14 having a positive electrode terminal 20, so that the battery 2 of the present invention is obtained.

As described above, the battery 2 of the present invention comprises a constitution of specifying the total amount of Li contained in the battery 2 and a constitution of depositing the rare earth hydroxide 50 on the surface of the hydrogen storage alloy particles 44 contained in the negative electrode 26 in combination. The total amount of Li contained in the battery 2 of the present invention is specified so that the conductive network is prevented from being destructed, and the cycle life can be extended. The rare earth hydroxide 50 is deposited on the surface of the hydrogen storage alloy particles 44, and the amount deposited is controlled such that the corrosion reaction of the hydrogen storage alloy is suppressed to reduce the amount of the alkaline electrolyte to be consumed. The exhaustion of the alkaline electrolyte in the separator can be thus prevented to suppress the rise of the internal resistance, so that a battery capable of high-current discharging with improved high-rate dischargeability can be obtained. Accordingly, the battery 2 of the present invention achieves cycle life properties compatible with high-rate dischargeability.

EXAMPLES

Example 1

1. Manufacturing of Battery
(1) Manufacturing of Positive Electrode

Nickel sulfate, zinc sulfate, and cobalt sulfate were weighed to obtain 3 mass % zinc and 1 mass % cobalt relative to nickel, and these substances were added to 1 N sodium hydroxide aqueous solution containing ammonium ions so as to prepare a mixed aqueous solution. While the mixed aqueous solution obtained was agitated, 10 N sodium hydroxide aqueous solution was gradually added to the mixed aqueous solution to cause a reaction. During the reaction, the pH was stabilized at 13 to 14, so that base particles 38 composed mainly of nickel hydroxide with solid-dissolved zinc and cobalt were formed.

The base particles 38 obtained were washed with 10 times the amount of pure water three times, and then dehydrated and dried. The base particles 38 had a spherical shape with an average particle diameter of 10 μm.

Subsequently, the base particles 38 obtained were injected into an ammonia aqueous solution. While the pH was maintained at 9 to 10 during the reaction, a cobalt sulfate aqueous solution was added thereto. Consequently cobalt hydroxide was deposited on the surface of the base particles 38 as nuclei, so that intermediate particles having a cobalt hydroxide layer with a thickness of about 0.1 μm were obtained. Subsequently the intermediate particles obtained were circulated in the high-temperature oxygen-containing air under an environment at 80° C., and subjected to a heating treatment for 45 minutes, while being sprayed with 12 N sodium hydroxide aqueous solution and 4 N lithium hydroxide aqueous solution. The treatment allowed the cobalt hydroxide on the surface of the intermediate particles to form into a cobalt oxyhydroxide having high conductivity and to incorporate sodium and lithium into the cobalt oxyhydroxide layer in parallel. As a result, a conductive layer 40 comprising a cobalt compound containing sodium and lithium was formed. Subsequently, the particles having the cobalt oxyhydroxide layer were filtered, and the residue was washed with water and then dried at 60° C. The positive electrode active material particles 36 having the conductive layer 40 comprising cobalt oxyhydroxide containing sodium and lithium on the surface of the base particles 38 were thus obtained.

Subsequently, 100 parts by mass of the positive electrode active material particles manufactured were mixed with 10 parts by mass of cobalt hydroxide, 0.5 parts by mass of zinc oxide, 0.5 parts by mass of yttrium oxide, and 40 parts by mass of dispersion liquid of HPC (binding material 42) to prepare a positive electrode active material paste. A nickel foam as the positive electrode base material was coated and filled with the positive electrode active material paste. The nickel foam bonded to the positive electrode active material particles was dried and then rolled and cut into a positive electrode 24 which contains lithium. In an aspect of the positive electrode mixture in the positive electrode obtained, the positive electrode active material particles 36 composed of the base particles 38 with the surface covered with a conductive layer 40 were in contact with each other as shown in the circle S in FIG. 1, so that a conductive network was formed from the conductive layer 40. Since nickel hydroxide has a theoretical capacity of 289 mAh/g, the amount filling the positive electrode 24 was controlled to have a capacity per sheet of the positive electrode of 2500 mAh.

(2) Manufacturing of Hydrogen Storage Alloy and Negative Electrode

First, an Ln component containing 25 mass % lanthan, 73 mass % samarium, and 2 mass % zirconium was prepared. The Ln component obtained, magnesium, nickel and aluminum were weighed to prepare a mixture including these at a molar ratio of 0.90:0.10:3.20:0.20. The mixture obtained was melted in an induction melting furnace so as to make an ingot. Subsequently, the ingot was heated under an argon gas atmosphere at a temperature of 1000° C. for 10 hours for heat treatment, so that an ingot of hydrogen storage alloy with a composition $(La_{0.25}Sm_{0.73}Zr_{0.02})_{0.90}Mg_{0.20}Al_{0.20}$ was obtained. The ingot was then mechanically crushed and sieved in an argon gas atmosphere, so that powder of hydrogen storage alloy particles remaining between 400-mesh and 200-mesh was selected. The measurement results of the granularity of the hydrogen storage alloy powder obtained by a laser diffraction and scattering particle size analyzer showed that the hydrogen storage alloy particles had an average particle diameter corresponding to the cumulative distribution at 50% of 30 μm, and a maximum particle diameter of 45 μm.

Subsequently, 7 N potassium hydroxide aqueous solution was prepared and heated to 80° C. The hydrogen storage alloy particles described above were immersed in the potassium hydroxide aqueous solution and maintained therein for 1 hour for the alkaline treatment of the hydrogen storage alloy particles to form rare earth hydroxides on the particle surface. The rare earth hydroxides formed on this occasion were confirmed to be the hydroxides of rare earth elements by the X-ray diffraction measurement (XRD measurement). The rare earth hydroxides are presumed to be hydroxides of La and Sm from the rare earth element components contained in the hydrogen storage alloy used in the Example. The alkaline-treated hydrogen storage alloy particles were then washed with water and dried to obtain hydrogen storage alloy particles subjected to the alkaline treatment. The specific surface area of the hydrogen storage alloy particles subjected to the alkaline treatment measured by the nitrogen gas adsorption BET method using a specific surface area measurement device was 0.4 m$^2$/g.

To 100 parts by mass of powder of the hydrogen storage alloy particles subjected to the alkaline treatment, 0.4 parts by mass of sodium polyacrylate, 0.1 parts by mass of carboxymethyl cellulose, 2.5 parts by mass of styrene-butadiene rubber copolymer, 1.0 part by mass of carbon black, and 30 parts by mass of water were added and kneaded to prepare the negative electrode mixture paste.

The negative electrode mixture paste was uniformly applied to both surfaces of a perforated iron plate as negative electrode substrate so as to have a consistent thickness. On this occasion, the through holes of the perforated plate were also filled with the negative electrode mixture paste. The perforated plate had a thickness of 60 µm, with the surfaces being nickel-plated.

After the paste was dried, the perforated plate bonded to the hydrogen storage alloy powder and the like was further rolled and cut into a hydrogen storage alloy-containing negative electrode 26 for the AA-size. The amount filling the negative electrode 26 was controlled to have a capacity per sheet of negative electrode of 3500 mAh. The capacity of the negative electrode was controlled to have an amount of the hydrogen storage alloy of 10.0 g, assuming a capacity per gram of the hydrogen storage alloy of 350 mAh.

(3) Assembling of Nickel Hydrogen Secondary Battery

The positive electrode 24 and the negative electrode 26 obtained were wound in a spiral form, with a separator 28 being inserted between them, so that an electrode group 22 was manufactured. The separator 28 for use in manufacturing the electrode group 22 comprising a polypropylene fiber non-woven fabric had a thickness of 0.1 mm (weight per unit area: 40 g/m$^2$).

The electrode group 22 was accommodated in an external can 10 having a bottomed cylindrical shape, into which a predetermined amount of 30 mass % sodium hydroxide aqueous solution containing lithium, potassium and sodium was injected as an alkaline electrolyte. In the alkaline electrolyte, the concentration of KOH was 5.0 N, the concentration of NaOH was 3.0 N, and the concentration of LiOH was 0.7 N. The opening of the external can 10 was then blocked with a lid plate 14 or the like, so that a nickel hydrogen secondary battery 2 with an AA size having a positive electrode capacity of 2500 mAh was assembled. Since the battery is a positive electrode-controlled battery having a negative electrode capacity larger than the positive electrode capacity, the positive electrode capacity of 2500 mAh was chosen as the nominal capacity of the battery. The measured total amount of LiOH contained in the battery in Example 1 was 100 mg, and the amount of LiOH per unit capacity of the positive electrode was 40 mg/Ah. The amount of LiOH per unit capacity of the positive electrode is shown in the column of the amount of Li in Table 1.

The amount of LiOH contained in a battery was measured by the following method.

After the whole of a battery was dissolved in concentrated nitric acid to obtain a solution, hydrogen peroxide water was injected to the solution to be neutralized. Subsequently the amount of Li contained in the neutralized solution was measured by atomic absorption analysis, and the measured value was converted into the amount of LiOH.

(4) Initial Activation Treatment

An initial activation treatment for charging the battery in Example 1 with a charging current of 0.1 C for 16 hours at a temperature of 25° C., and then for discharging with a discharging current of 0.2 C until the battery voltage reached 0.5 V was repeated twice. The battery in a usable state was thus obtained.

Examples 2 to 3

Except that the time for immersing the hydrogen storage alloy particles in a potassium hydroxide aqueous solution was appropriately changed to have a specific surface area of the hydrogen storage alloy particles of 0.1 m$^2$/g or 0.5 m$^2$/g, a nickel hydrogen secondary battery was obtained in the same manner as in Example 1.

Examples 4 to 5

Except that the concentration of the lithium hydroxide aqueous solution to be sprayed to the intermediate particles for use in the positive electrode was appropriately changed to have a LiOH mass per unit capacity of the positive electrode contained in the battery of 15 mg/Ah or 50 mg/Ah, a nickel hydrogen secondary battery was obtained in the same manner as in Example 1.

Example 6

Except that the composition of the hydrogen storage alloy was changed to $(La_{0.25}Sm_{0.73}Zr_{0.02})_{0.90}Mg_{0.10}Ni_{3.00}Al_{0.20}Mn_{0.10}Co_{0.10}$, a nickel hydrogen secondary battery was obtained in the same manner as in Example 1.

Example 7

Except that the composition of the hydrogen storage alloy was changed to $(La_{0.10}Sm_{0.88}Zr_{0.02})_{0.90}Mg_{0.10}Ni_{3.20}Al_{0.20}$, a nickel hydrogen secondary battery was obtained in the same manner as in Example 1.

Example 8

Except that the composition of the hydrogen storage alloy was changed to $(La_{0.88}Sm_{0.10}Zr_{0.02})_{0.90}Mg_{0.10}Ni_{3.20}Al_{0.20}$, a nickel hydrogen secondary battery was obtained in the same manner as in Example 1.

Example 9

Except that 0.3 parts by mass of niobium oxide powder as additive was further added to the positive electrode mixture paste in manufacturing of the positive electrode, a nickel hydrogen secondary battery was obtained in the same manner as in Example 1.

Example 10

Except that 0.3 parts by mass of ytterbium oxide powder as additive was further added to the positive electrode mixture paste in manufacturing of the positive electrode, a nickel hydrogen secondary battery was obtained in the same manner as in Example 1.

Example 11

Except that 0.3 parts by mass of tungsten oxide powder as additive was further added to the positive electrode mixture paste in manufacturing of the positive electrode, a nickel hydrogen secondary battery was obtained in the same manner as in Example 1.

Comparative Example 1

Except that in manufacturing of the positive electrode, the concentration of the lithium hydroxide aqueous solution to be sprayed to the intermediate particles was appropriately changed to have a LiOH mass per unit capacity of the positive electrode of 12 mg/Ah, and that the hydrogen storage alloy particles were not immersed in a potassium hydroxide aqueous solution for alkali treatment, a nickel hydrogen secondary battery was obtained in the same manner as in Example 1.

Comparative Example 2

Except that the hydrogen storage alloy particles were not immersed in a potassium hydroxide aqueous solution for alkali treatment, a nickel hydrogen secondary battery was obtained in the same manner as in Example 1.

Comparative Example 3

Except that in manufacturing of the positive electrode, the concentration of the lithium hydroxide aqueous solution to be sprayed to the intermediate particles was appropriately changed to have a LiOH mass per unit capacity of the positive electrode of 12 mg/Ah, a nickel hydrogen secondary battery was obtained in the same manner as in Example 1.

Comparative Example 4

Except that the time for immersing the hydrogen storage alloy particles in a potassium hydroxide aqueous solution was appropriately changed to have a specific surface area of the hydrogen storage alloy particles of 0.7 m$^2$/g, a nickel hydrogen secondary battery was obtained in the same manner as in Example 1.

Comparative Example 5

Except that the composition of the hydrogen storage alloy was changed to $La_{0.70}Ce_{0.30}Ni_{3.80}Al_{0.30}Mn_{0.40}Co_{0.50}$, a nickel hydrogen secondary battery was obtained in the same manner as in Example 1.

Comparative Example 6

Except that in manufacturing of the positive electrode, the concentration of the lithium hydroxide aqueous solution to be sprayed to the intermediate particles was appropriately changed to have a LiOH mass per unit capacity of the positive electrode of 51 mg/Ah, a nickel hydrogen secondary battery was obtained in the same manner as in Example 1.

2. Evaluation of Nickel Hydrogen Secondary Battery
(1) Discharge Capacity Ratio of Nickel Hydrogen Secondary Battery When the batteries subjected to the initial activation treatment in Examples 1 to 11 and Comparative Examples 1 to 6 were charged with a charging current of 1.0 C for 1 hour under an environment at 25° C., and then discharged with a discharging current of 0.2 C until the discharge termination voltage reached 0.8 V under an environment at 25° C., the discharge capacity of the battery was measured. The discharge capacity on this occasion was referred to as discharge capacity at 0.2 C.

Subsequently, when the batteries in Examples 1 to 11 and Comparative Examples 1 to 6 were charged with a charging current of 1.0 C for 1 hour under an environment at 25° C., and then discharged with a discharging current of 4.0 C until the discharge termination voltage reached 0.8 V under an environment at 25° C., the discharge capacity of the battery was measured. The discharge capacity on this occasion was referred to as discharge capacity at 4.0 C.

The ratio of the discharge capacity at 4.0 C to the discharge capacity at 0.2 C (discharge capacity ratio) was obtained. Assuming the discharge capacity ratio of the battery in Comparative Example 1 to be 100, the ratio to the discharge capacity ratio of each of the batteries was obtained. The results are also shown in the column of the high-rate dischargeability in Table 1. As the discharge capacity ratio of a battery increases, the battery can discharge a higher current, having excellent high-rate dischargeability. Namely, as the numerical value in the column of high-rate dischargeability increases, the more excellent high-rate dischargeability can be obtained.

(2) Cycle Life Properties

The batteries subjected to the initial activation treatment in Examples 1 to 11 and Comparative Examples 1 to 6 were charged with a charging current of 1.0 C for 1 hour under an environment at 25° C., then discharged with a discharging current of 1.0 C until the voltage of the battery reached 0.8 V under an environment at 25° C., and then left standing for 10 minutes.

When the charge-discharge cycle described above was assumed to be one cycle and the initial capacity of each of the batteries was assumed to be 100%, the number of cycles until the capacity retention ratio to the initial capacity reached less than 60% was counted. The counted number was referred to as the cycle life. Assuming the number of cycles when the battery in Comparative Example 1 reached the cycle life to be 100, the ratio to the number of cycles when each of the batteries reached the cycle life was obtained. The results are also shown in the column of the cycle life properties in Table 1. As the numerical value in the column of the cycle life properties increases, the longer cycle life can be obtained, having excellent cycle life properties

TABLE 1

| | Amount of Li [mg/Ah] | Positive electrode additive | Specific surface area of hydrogen storage alloy [m$^2$/g] | Composition of hydrogen storage alloy | High-rate dischargeability | Cycle life properties |
|---|---|---|---|---|---|---|
| Example 1 | 40 | Yttrium oxide | 0.4 | $(La_{0.25}Sm_{0.73}Zr_{0.02})_{0.90}Mg_{0.10}Ni_{3.20}Al_{0.20}$ | 125 | 150 |
| Example 2 | 40 | Yttrium oxide | 0.1 | $(La_{0.25}Sm_{0.73}Zr_{0.02})_{0.90}Mg_{0.10}Ni_{3.20}Al_{0.20}$ | 115 | 120 |
| Example 3 | 40 | Yttrium oxide | 0.5 | $(La_{0.25}Sm_{0.73}Zr_{0.02})_{0.90}Mg_{0.10}Ni_{3.20}Al_{0.20}$ | 120 | 155 |

TABLE 1-continued

| | Amount of Li [mg/Ah] | Positive electrode additive | Specific surface area of hydrogen storage alloy [m$^2$/g] | Composition of hydrogen storage alloy | High-rate dischargeability | Cycle life properties |
|---|---|---|---|---|---|---|
| Example 4 | 15 | Yttrium oxide | 0.4 | $(La_{0.25}Sm_{0.73}Zr_{0.02})_{0.90}$ $Mg_{0.10}Ni_{3.20}Al_{0.20}$ | 115 | 150 |
| Example 5 | 50 | Yttrium oxide | 0.4 | $(La_{0.25}Sm_{0.73}Zr_{0.02})_{0.90}$ $Mg_{0.10}Ni_{3.20}Al_{0.20}$ | 120 | 150 |
| Example 6 | 40 | Yttrium oxide | 0.4 | $(La_{0.25}Sm_{0.73}Zr_{0.02})_{0.90}$ $Mg_{0.10}Ni_{3.00}Al_{0.20}$ $Mn_{0.10}Co_{0.10}$ | 128 | 130 |
| Example 7 | 40 | Yttrium oxide | 0.4 | $(La_{0.10}Sm_{0.88}Zr_{0.02})_{0.90}$ $Mg_{0.10}Ni_{3.20}Al_{0.20}$ | 140 | 140 |
| Example 8 | 40 | Yttrium oxide | 0.4 | $(La_{0.88}Sm_{0.10}Zr_{0.02})_{0.90}$ $Mg_{0.10}Ni_{3.20}Al_{0.20}$ | 115 | 150 |
| Example 9 | 40 | Yttrium oxide + Niobium oxide | 0.4 | $(La_{0.25}Sm_{0.73}Zr_{0.02})_{0.90}$ $Mg_{0.10}Ni_{3.20}Al_{0.20}$ | 130 | 155 |
| Example 10 | 40 | Yttrium oxide + Ytterbium oxide | 0.4 | $(La_{0.25}Sm_{0.73}Zr_{0.02})_{0.90}$ $Mg_{0.10}Ni_{3.20}Al_{0.20}$ | 128 | 152 |
| Example 11 | 40 | Yttrium oxide + Tungsten oxide | 0.4 | $(La_{0.25}Sm_{0.73}Zr_{0.02})_{0.90}$ $Mg_{0.10}Ni_{3.20}Al_{0.20}$ | 130 | 150 |
| Comparative Example 1 | 12 | Yttrium oxide | 0.03 | $(La_{0.25}Sm_{0.73}Zr_{0.02})_{0.90}$ $Mg_{0.10}Ni_{3.20}Al_{0.20}$ | 100 | 100 |
| Comparative Example 2 | 40 | Yttrium oxide | 0.03 | $(La_{0.25}Sm_{0.73}Zr_{0.02})_{0.90}$ $Mg_{0.10}Ni_{3.20}Al_{0.20}$ | 90 | 110 |
| Comparative Example 3 | 12 | Yttrium oxide | 0.4 | $(La_{0.25}Sm_{0.73}Zr_{0.02})_{0.90}$ $Mg_{0.10}Ni_{3.20}Al_{0.20}$ | 75 | 125 |
| Comparative Example 4 | 40 | Yttrium oxide | 0.7 | $(La_{0.25}Sm_{0.73}Zr_{0.02})_{0.90}$ $Mg_{0.10}Ni_{3.20}Al_{0.20}$ | 102 | 152 |
| Comparative Example 5 | 40 | Yttrium oxide | 0.4 | $La_{0.70}Ce_{0.30}Ni_{3.80}Al_{0.30}$ $Mn_{0.40}Co_{0.50}$ | 75 | 100 |
| Comparative Example 6 | 51 | Yttrium oxide | 0.4 | $(La_{0.25}Sm_{0.73}Zr_{0.02})_{0.90}$ $Mg_{0.10}Ni_{3.20}Al_{0.20}$ | 95 | 135 |

(3) Consideration

In comparison with the battery in Comparative Example 1 which contains a smaller amount of Li in the battery, including hydrogen storage alloy particles without alkaline treatment, the battery in Comparative Example 2 which contains Li in the positive electrode has improved cycle life properties but has lowered high-rate dischargeability. It was therefore found that the increase in the amount of Li only cannot achieve the compatibility of the two properties. The reason is that the Li-containing positive electrode allows the alkaline electrolyte to be incorporated between the layers of nickel hydroxide crystal, so that the amount of the alkaline electrolyte contained in the separator decreases, resulting in the rise of the internal resistance of the entire battery.

The battery including hydrogen storage alloy particles subjected to alkaline treatment in Comparative Example 3 also had improved cycle properties and declined high-rate dischargeability. It is conceivable that the discharge properties declined not allowing the pulverization of the hydrogen storage alloy to proceed due to the enhanced corrosion resistance of the hydrogen storage alloy.

The battery including a Li-containing positive electrode with hydrogen storage alloy particles subjected to alkaline treatment in Example 1 had further improved cycle life properties, and had greatly improved high-rate dischargeability, which had declined by either one of changes in the increase in the amount of Li in the positive electrode and the alkaline treatment of the hydrogen storage alloy, and thus an unexpected effect was produced. It is conceivable that even though the alkaline electrolyte was incorporated in the positive electrode, the corrosion reaction between the hydrogen storage alloy and the alkaline electrolyte was suppressed due to the enhanced corrosion resistance of the hydrogen storage alloy, so that the alkaline electrolyte not consumed in the negative electrode was retained to the separator. Consequently the rise of the internal resistance of the entire battery was suppressed.

From the results in Examples 1, 2 and 3, and Comparative Examples 2 and 4, it is shown that the alkaline treatment of hydrogen storage alloy particles to have a specific surface area of about 0.1 to 0.5 m$^2$/g is effective.

From the results in Examples 1 and 6, it is shown that the Co and Mn contained in the hydrogen storage alloy cause the decline of cycle life properties, so that the removal of Co and Mn are preferred. It is conceivable that since Co and Mn are elements easily eluting into an alkaline electrolyte, the composition of the hydrogen storage alloy changes during the charge-discharge cycle.

From the results in Example 1 and Comparative Example 5, it is shown that the AB$_5$-based hydrogen storage alloy containing no Mg has no effect on the compatibility between the cycle life properties and the high-rate dischargeability.

From the results in Examples 1, 7 and 8, the preferred amount of La contained in the hydrogen storage alloy is 20 mass % or more, and the preferred amount of Sm is 20 mass % or more. The conceivable reason is that a rare earth element reacts with an alkaline electrolyte to form a hydroxide of the rare earth element, and the reaction is slightly different from each of the elements.

From the results in Examples 1, 9, 10 and 11, it is shown that the addition of niobium oxide, ytterbium oxide, and tungsten oxide besides yttrium oxide to the positive electrode further enhances both of the high-rate dischargeability and the cycle life properties. The conceivable reason is that the additives change the charging acceptability of the positive electrode so as to control the amount of the alkaline electrolyte to be incorporated between the layers of nickel hydroxide.

As described above, the present invention can provide a nickel hydrogen secondary battery having both of enhanced high-rate dischargeability and enhanced cycle life properties, based on the technical idea for controlling the amount of Li in the nickel hydrogen secondary battery and the specific surface area of rare earth-Mg—Ni-based hydrogen storage alloy particles within specified ranges, respectively. The industrial value of the invention is very high.

The present invention is not limited to the embodiment and Examples described above, and various modifications may be made. For example, the nickel hydrogen secondary battery may be a rectangular battery, and the mechanical structure is not specifically limited.

REFERENCE SIGNS LIST

2 Nickel hydrogen secondary battery
22 Electrode group
24 Positive electrode
26 Negative electrode
28 Separator
36 Positive electrode active material particle
44 Hydrogen storage alloy particle
50 Rare earth hydroxide

The invention claimed is:

1. A nickel hydrogen secondary battery comprising an electrode group hermetically enclosed in a container together with an alkaline electrolyte, the electrode group including a positive electrode and a negative electrode which are stacked one on top of another through a separator, wherein
the nickel hydrogen secondary battery contains Li, with a total amount of Li in the nickel hydrogen secondary battery of 15 to 50 mg/Ah, as determined as the mass in terms of LiOH per Ah of the positive electrode capacity,
the negative electrode includes particles of a rare earth-Mg—Ni-based hydrogen storage alloy which contains a rare earth element, Mg and Ni,
the particles of the hydrogen storage alloy include, on the surface thereof, a rare earth hydroxide which is a hydroxide of the rare earth element, and have a specific surface area of 0.1 to 0.5 m²/g, and
the hydrogen storage alloy has a composition excluding yttrium in non-incidental quantities, and the composition is represented by a general formula: $Ln_{1-x}Mg_x(Ni_{1-y}T_y)_z$, wherein Ln represents at least one element selected from La, Pr, Nd, Pm, Sm, Eu, Ca, Sr, Sc, Ti, Zr and Hf; T represents at least one element selected from Mn, Co, V, Nb, Ta, Cr, Mo, Fe, Al, Ga, Zn, Sn, In, Cu, Si, P and B; and the subscripts x, y and z satisfy relations $0<x\leq1$, $0\leq y\leq0.5$, and $2.5\leq z\leq4.5$, respectively.

2. The nickel hydrogen secondary battery according to claim 1, wherein the hydrogen storage alloy composition is configured to exclude Mn and Co.

3. The nickel hydrogen secondary battery according to claim 1, wherein the content of La is 20 mass % or more based on a total mass of the rare earth element contained in the hydrogen storage alloy.

4. The nickel hydrogen secondary battery according to claim 1, wherein the content of Sm is 20 mass % or more based on a total mass of the rare earth element contained in the hydrogen storage alloy.

5. The nickel hydrogen secondary battery according to claim 1, wherein the positive electrode comprises positive electrode active material particles,
wherein the positive electrode active material particles comprise base particles composed mainly of nickel hydroxide and a conductive layer comprising a Li-containing Co compound and covering the surface of the base particles.

6. The nickel hydrogen secondary battery according to claim 1, wherein the positive electrode comprises at least one selected from the group consisting of a Nb compound, an Yb compound, and a W compound, as an additive.

7. The nickel hydrogen secondary battery according to claim 1, wherein the alkaline electrolyte comprises LiOH.

8. The nickel hydrogen secondary battery according to claim 1, wherein the rare earth hydroxide are needle crystals deposited on the surface of the hydrogen storage alloy particles.

9. The nickel hydrogen secondary battery according to claim 1, wherein in the composition of the hydrogen storage alloy, Ln consists of La, Sm and Zr.

* * * * *